(12) United States Patent
Dudar

(10) Patent No.: US 10,900,857 B2
(45) Date of Patent: *Jan. 26, 2021

(54) METHODS AND SYSTEMS FOR FLUID LEAK DETERMINATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

This patent is subject to a terminal disclaimer.

(21) Appl. No.: 16/113,149

(22) Filed: Aug. 27, 2018

(65) Prior Publication Data

US 2019/0376869 A1    Dec. 12, 2019

Related U.S. Application Data

(63) Continuation-in-part of application No. 16/001,175, filed on Jun. 6, 2018.

(51) Int. Cl.
| | | |
|---|---|---|
| *G01M 3/00* | (2006.01) | |
| *G01M 3/38* | (2006.01) | |
| *G01M 3/16* | (2006.01) | |
| *G01M 3/02* | (2006.01) | |
| *B60R 1/00* | (2006.01) | |

(52) U.S. Cl.
CPC .............. *G01M 3/007* (2013.01); *B60R 1/00* (2013.01); *G01M 3/025* (2013.01); *G01M 3/16* (2013.01); *G01M 3/38* (2013.01); *B60R 2300/105* (2013.01); *B60R 2300/80* (2013.01); *G06T 2207/30264* (2013.01); *G06T 2210/24* (2013.01)

(58) Field of Classification Search
CPC ........ G01M 3/007; G01M 3/025; G01M 3/16; G01M 3/38; B60R 1/00; B60R 2300/105; B60R 2300/80; G06T 2207/30264; G06T 2210/24
See application file for complete search history.

(56) References Cited

U.S. PATENT DOCUMENTS

| | | | |
|---|---|---|---|
| 3,836,253 A * | 9/1974 | Colvin ..................... | G01M 3/38 356/70 |
| 6,791,088 B1 * | 9/2004 | Williams, II ......... | G01M 3/047 250/343 |
| 6,913,446 B2 | 7/2005 | Nissen et al. | |
| 8,193,496 B2 | 6/2012 | Furry | |
| 10,275,662 B1 * | 4/2019 | Askeland ............... | H04N 5/247 |
| 10,475,208 B1 * | 11/2019 | Morrison ........... | G06Q 30/0278 |

(Continued)

FOREIGN PATENT DOCUMENTS

| | | |
|---|---|---|
| DE | 102015005622 A1 | 11/2016 |
| JP | 2003028745 A | 1/2003 |

(Continued)

*Primary Examiner* — Calvin Cheung
(74) *Attorney, Agent, or Firm* — Geoffrey Brumbaugh; McCoy Russell LLP

(57) ABSTRACT

Methods and systems are provided for a fluid leak diagnostic. In one example, a method may include intrusively increasing a fluid pump displacement to determine if an internal fluid leak is occurring. The method may further include adjusting a parking routine to determine if an external fluid leak is occurring.

18 Claims, 8 Drawing Sheets

(56) References Cited

U.S. PATENT DOCUMENTS

| | | | |
|---|---|---|---|
| 2005/0104746 A1* | 5/2005 | Nath | G06Q 30/0284 340/932.2 |
| 2006/0262963 A1* | 11/2006 | Navulur | G06K 9/0063 382/109 |
| 2007/0087311 A1* | 4/2007 | Garvey, III | G01J 5/025 434/21 |
| 2007/0097209 A1* | 5/2007 | Kubota | B62D 15/0275 348/118 |
| 2009/0301174 A1* | 12/2009 | Wen | G01M 3/3227 73/49.7 |
| 2010/0283633 A1* | 11/2010 | Becker | B60R 1/00 340/932.2 |
| 2011/0018991 A1* | 1/2011 | Watanabe | B62D 15/0275 348/118 |
| 2011/0018996 A1* | 1/2011 | Mian | G08B 13/1672 348/143 |
| 2012/0101747 A1* | 4/2012 | Kielkopf | G01M 3/002 702/51 |
| 2013/0079963 A1* | 3/2013 | Shono | H02K 9/19 701/22 |
| 2014/0064553 A1* | 3/2014 | Knauth | G06K 9/00771 382/103 |
| 2014/0074345 A1* | 3/2014 | Gabay | G07C 5/08 701/31.4 |
| 2014/0210984 A1* | 7/2014 | Warwick | F02C 7/28 348/81 |
| 2014/0277998 A1* | 9/2014 | Martin | F02D 41/123 701/102 |
| 2014/0330482 A1* | 11/2014 | Yang | F02M 25/0809 701/34.4 |
| 2014/0373942 A1* | 12/2014 | Nagy | E04H 6/428 137/312 |
| 2015/0028208 A1* | 1/2015 | Xu | G01M 3/002 250/338.5 |
| 2015/0317787 A1* | 11/2015 | Badawy | G06T 7/001 382/152 |
| 2015/0334315 A1* | 11/2015 | Teich | H04N 5/2257 348/164 |
| 2016/0010537 A1* | 1/2016 | Strode | G01M 3/025 701/114 |
| 2016/0055653 A1 | 2/2016 | Badawy et al. | |
| 2016/0069743 A1* | 3/2016 | McQuilkin | G01J 3/2823 356/416 |
| 2016/0101734 A1* | 4/2016 | Baek | H04N 5/23293 348/148 |
| 2016/0148363 A1* | 5/2016 | Phan | G06K 9/00664 348/142 |
| 2016/0284075 A1* | 9/2016 | Phan | G06K 9/00664 |
| 2016/0364620 A1* | 12/2016 | Akiyama | G06K 9/00791 |
| 2017/0124378 A1* | 5/2017 | High | G06Q 10/06315 |
| 2018/0079533 A1* | 3/2018 | Suchezky | B64D 47/08 |
| 2018/0173961 A1* | 6/2018 | Jain | G06T 7/40 |
| 2018/0197048 A1* | 7/2018 | Micks | H04N 13/275 |
| 2019/0120159 A1* | 4/2019 | Brinkman | F02D 41/222 |
| 2019/0375520 A1* | 12/2019 | Parker | G07C 5/0816 |
| 2019/0382001 A1* | 12/2019 | Chelian | G05D 1/0088 |
| 2019/0392656 A1* | 12/2019 | Sarwar | G08B 21/182 |

FOREIGN PATENT DOCUMENTS

| | | | |
|---|---|---|---|
| KR | 20100043976 A | 4/2010 | |
| WO | WO2019/133755 A1 * | 4/2019 | ............. H04N 5/14 |

* cited by examiner

METHODS AND SYSTEMS FOR FLUID LEAK DETERMINATION

CROSS REFERENCE TO RELATED APPLICATION

The present application is a continuation-in-part of U.S. Non-Provisional patent application Ser. No. 16/001,175, entitled "METHODS AND SYSTEMS FOR OIL LEAK DETERMINATION", filed on Jun. 6, 2018. The entire contents of the above-listed application are hereby incorporated by reference in its entirety for all purposes.

FIELD

The present description relates generally to determining a fluid leak via one or more image capturing devices arranged on a vehicle.

BACKGROUND/SUMMARY

As future vehicle are converted to autonomous, driverless type vehicles, human determinations may become less reliable. Furthermore, users participating in a car sharing service may have less of a vested interest in maintaining a vehicle. As such, vehicle diagnostics and some maintenance may shift to also be autonomous.

Fluid leaks may occur due to a variety of reasons, which may result in an undesired loss of lubricants, coolant, or other vehicle fluids. For example, coolant leaks may occur internally due to one or more of a degraded engine head gasket, a degraded engine cylinder head, and a degraded engine block, wherein the internal coolant leak may result in a changed exhaust color and smell. Coolant leaks may occur externally due to one or more of a degraded radiator cap, degas bottle leak, degraded radiator, worn coolant hose, degraded coolant pump, and a blocked freeze plug. Current coolant leak diagnostics may depend on human operator inputs and/or addition of auxiliary components, such as a spectrometer, to the vehicle.

However, the inventors herein have recognized potential issues with such systems. As one example, spectrometers may be expensive and increase packaging restraints. Furthermore, the conditions exposed to the spectrometer (e.g., temperature, humidity, airborne particles, etc.) may degrade the spectrometer, further burdening a vehicle operator and/or demanding a diagnostic for determination of its fidelity. Additionally, dependence on human operator inputs may be cumbersome to the human operator and unreliable.

In one example, the issues described above may be addressed by a method for increasing fluid pump output intrusively to a high displacement during a high engine load in response to a fluid volume decreasing at greater than a threshold rate. In this way, an image capturing device may detect a fluid leak during the high engine load by comparing images of exhaust gas captured by the image capturing device before and after increasing the fluid pump output.

As one example, the method may further include where the image capturing device captures multiple images of exhaust gas and passes the images through a color frequency to determine an amount of color in each of the images. In one example, the method may be executed to determine if the fluid leak is a coolant leak, wherein the images may be passed through a white frequency to determine an amount of white in each of the images. An internal coolant leak may be determined in response to an amount of white in one or more of the images following the increase in a coolant pump output being greater than a threshold amount of white. Additionally or alternatively, an internal fuel leak may be determined in response to an amount of black in one or more of the images. In some examples of the method, additionally or alternatively, the fluid pump may be an oil pump, coolant pump, water pump, or the like, and where the fluid pump may be arranged on an autonomous vehicle.

In some examples, the method may further include a diagnostic for determining an external fluid leak, the external fluid leak diagnostic including arranging a vehicle outside of a parking spot in a first position, capturing a first image of the parking spot via an image capturing device, propelling the vehicle to the parking spot, propelling the vehicle to a second position after parking the vehicle, capturing a second image of the parking spot, and determining an external fluid leak based on a comparison of the first and second images.

In some examples, the method may further include where the comparison includes assigning gray scale values to the first and second images, and where the gray scale values include a gray scale value selected between 1 to 5 assigned to each pixel of the first and second images, wherein 1 corresponds to a light gray color and 5 corresponds to a dark gray color. The external fluid leak may be occurring if a sum of the gray scale values of the first image is not equal to a sum of the gray scale values of the second image. The image capturing device may be one of a plurality of image capturing devices, wherein the plurality of image capturing devices may be arranged around a periphery of the vehicle. The first position is outside of the parking spot by a total length of the vehicle and the second position may be outside of the parking spot by some measurement of the vehicle. In one example, the first position and the second position are identical. However, it will be appreciated that the first and second positions may be different, as will be described in greater detail below. In some examples, the method is executed in response to detecting a fluid volume decreasing at greater than a threshold rate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
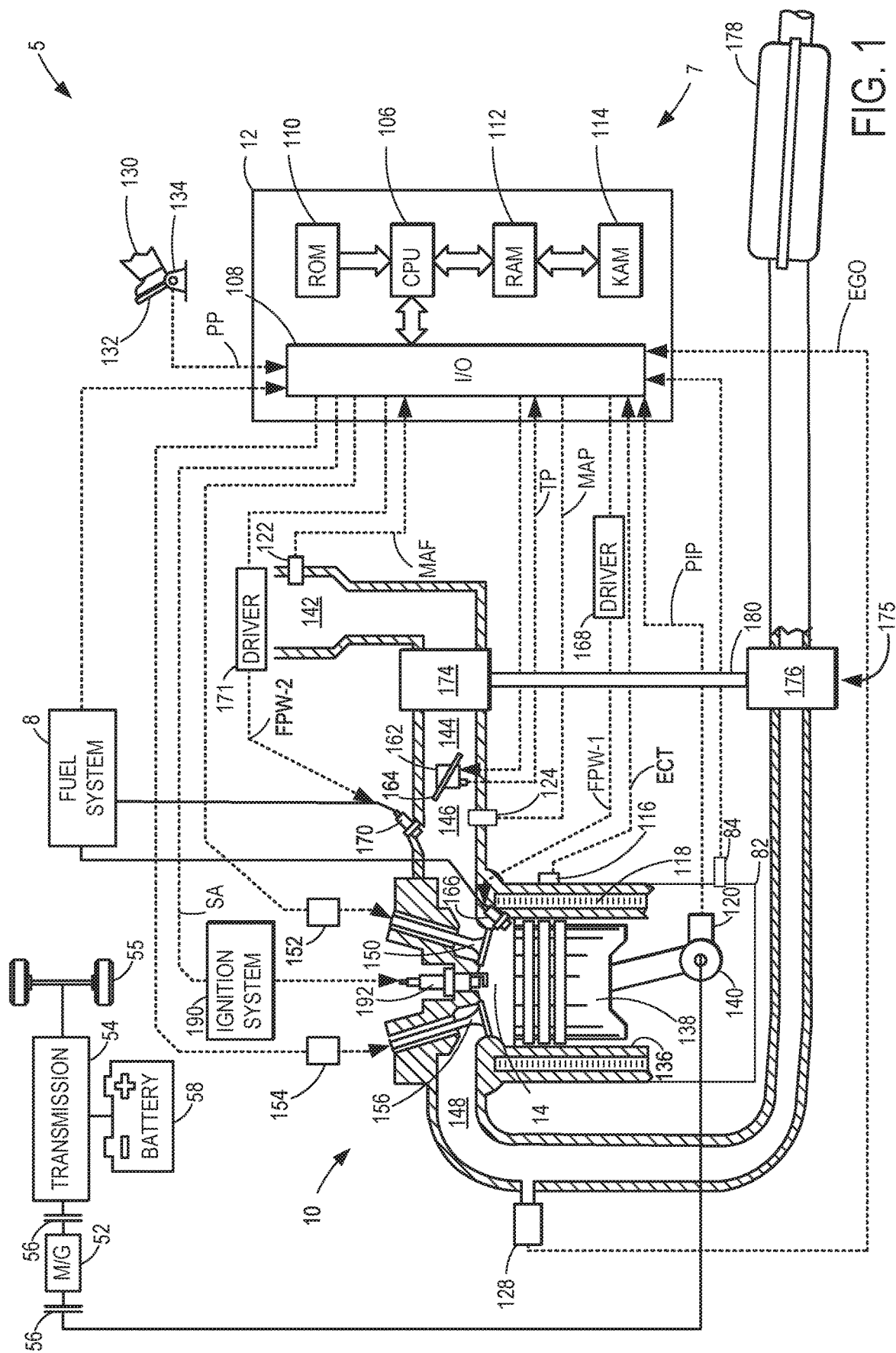
FIG. 1 shows an engine system schematic of a vehicle.
Figure 2:
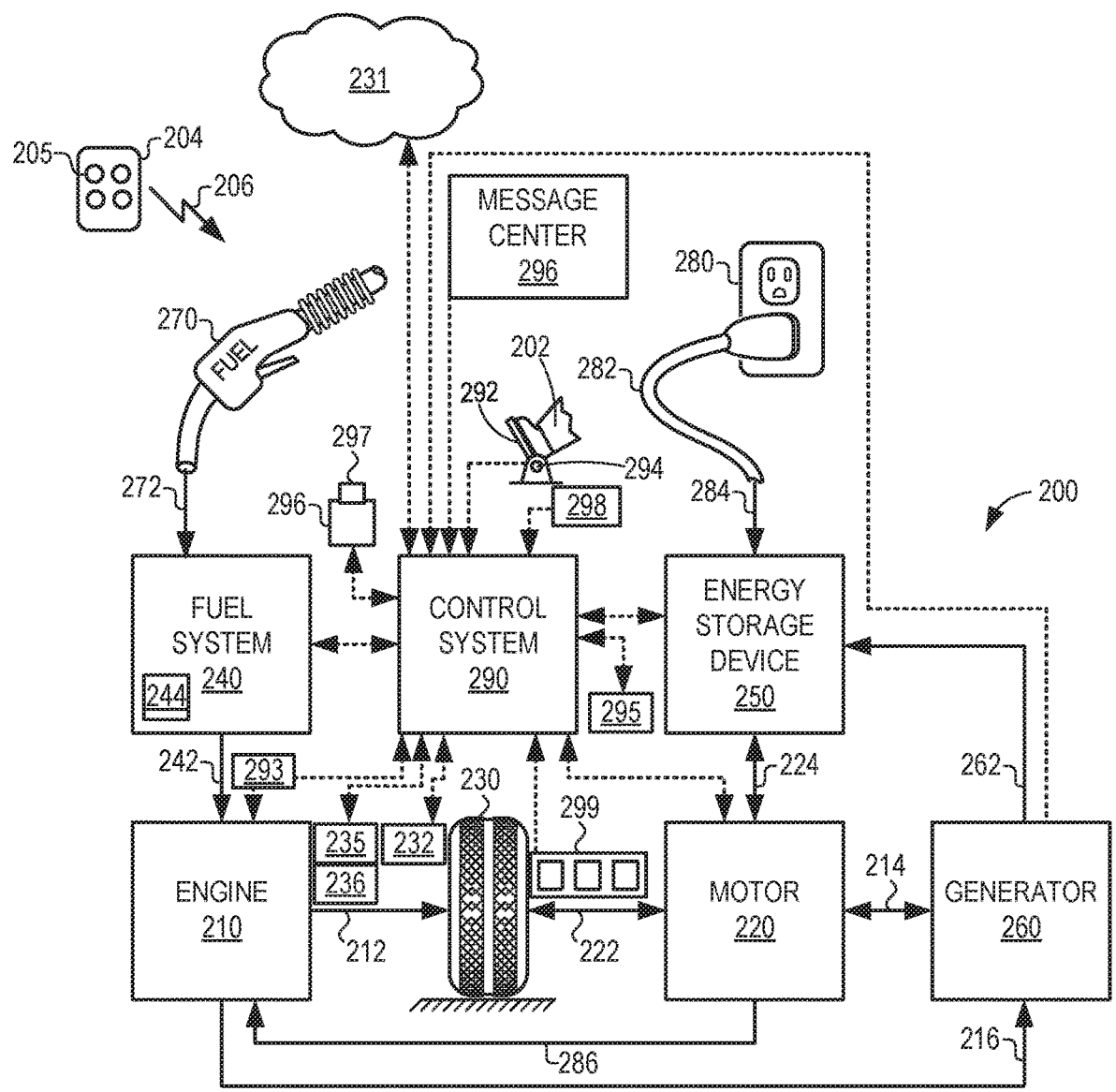
FIG. 2 schematically shows an example vehicle propulsion system.
Figure 3:
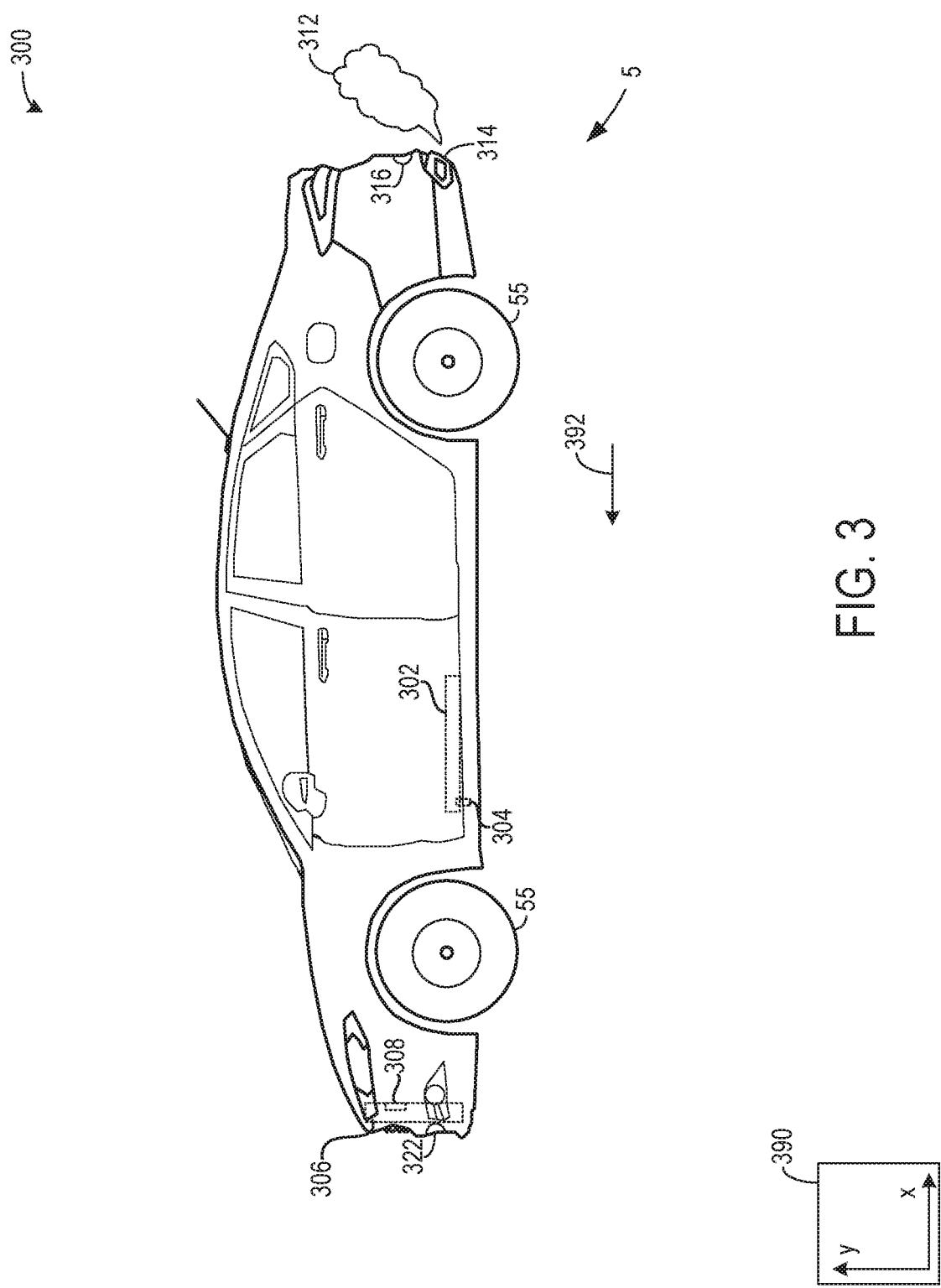
FIG. 3 shows the vehicle propelling while visualizing exhaust gas smoke.

The following description relates to determining vehicle fluid leaks. The vehicle may be a hybrid vehicle, including a plug-in hybrid vehicle. An example of the vehicle is shown in FIGS. 1, 2, and 3. The vehicle may further comprise one or more of a turbocharger, intake and exhaust valves, a crankcase, coolant passages, and the like. The vehicle may develop one or more leaks, wherein the leak may be determined via analyzing images captured of exhaust gas and/or a ground directly below an underbody of the vehicle.

A controller of an engine system of the vehicle may comprise instructions stored on non-transitory memory thereof that when executed enable to controller to direct the reverse camera toward a desired location (e.g., a vehicle exhaust pipe), capture one or more images of the exhaust gas and the ground upon above which the vehicle may park, and analyze an amount of a specified color, such as a visible color in the visible light spectrum. In one particular example, the visible color includes blue. In one example, the wavelength of light may be between 450-495 nm. In another example, the visible light of interest may be between 380-450, or 380-495 nm. In another example, an amount of white in the exhaust gas may be measured. A filtering lens on the camera may be used that passes visible light within this spectrum, if desired, or digital filtering to identify light captured within these wavelengths may be used. Additionally or alternatively, the color includes gray. A value of grayness may be assigned based on an amount of color absorption, wherein the value is less gray when less color is absorbed.

Thus, prior to analyzing the light, the controller may integrate and apply one or more filters to the images. If the amount of color is greater than a threshold amount, then it may be determined that an internal fluid leak is occurring, wherein the fluid leak is being combusted. That is to say, the fluid leak is leaking into directly into a combustion chamber or into a passage leading to the combustion chamber such that fluid from the fluid leak is being combusted. For example, if the number of pixels, each having an intensity of the specified color or combination of colors (e.g., white) above a threshold level, is greater than a threshold pixel number, an indication of fluid leaking may be generated.

Figure 4:
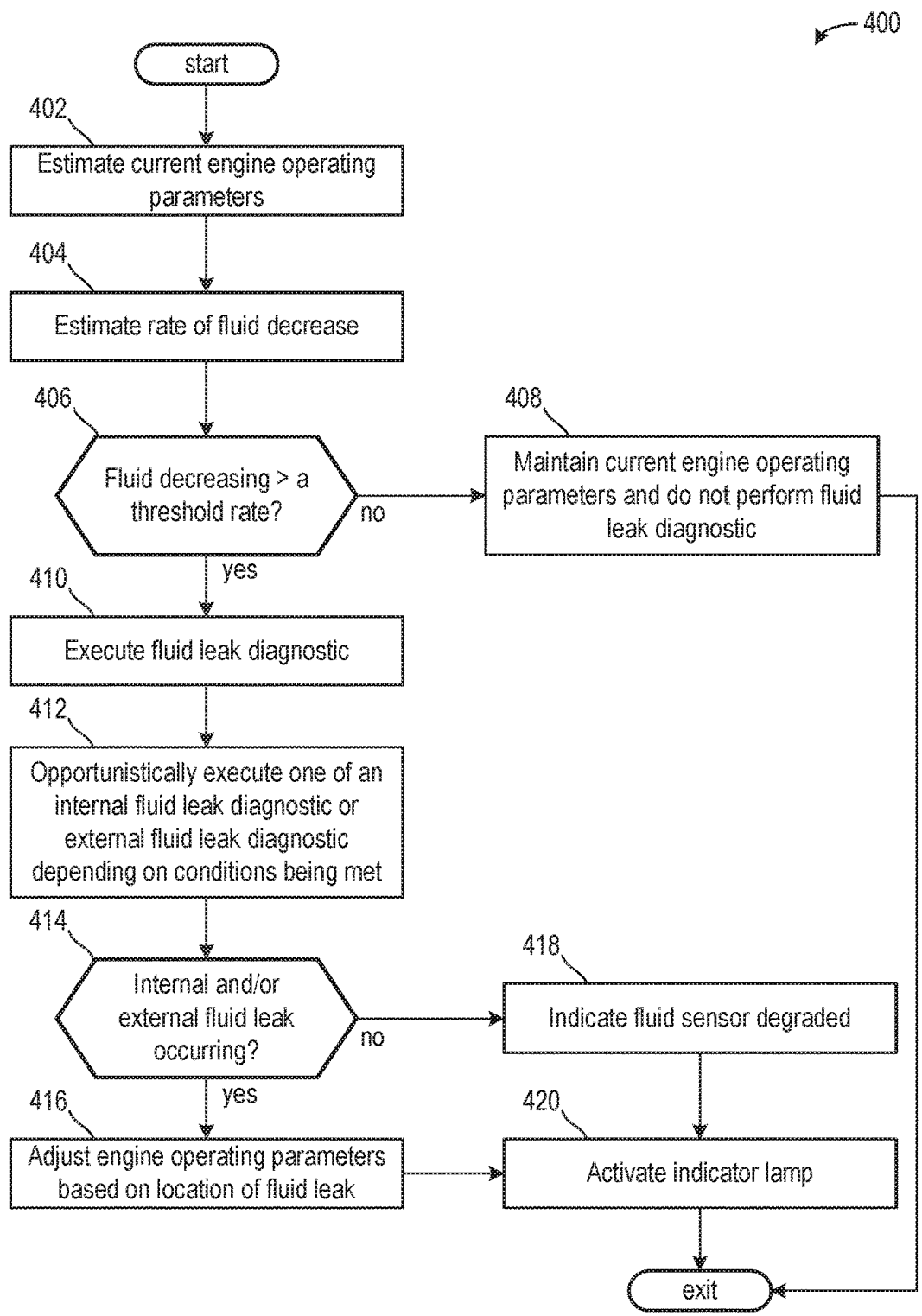
FIG. 4 shows a high-level flow chart illustrating a method for executing a fluid leak diagnostic.

FIG. 4 illustrates a high-level flow chart for executing a fluid leak diagnostic based on a fluid sensor sensing a fluid volume decreasing at greater than a threshold rate. The fluid leak diagnostic may include an internal fluid leak diagnostic and an external fluid leak diagnostic, both diagnostics being executed via scanning images captured by one or more image capturing devices mounted on a periphery of the vehicle. The fluid leak diagnostic may include an oil leak diagnostic and a coolant leak diagnostic.

Figure 5:
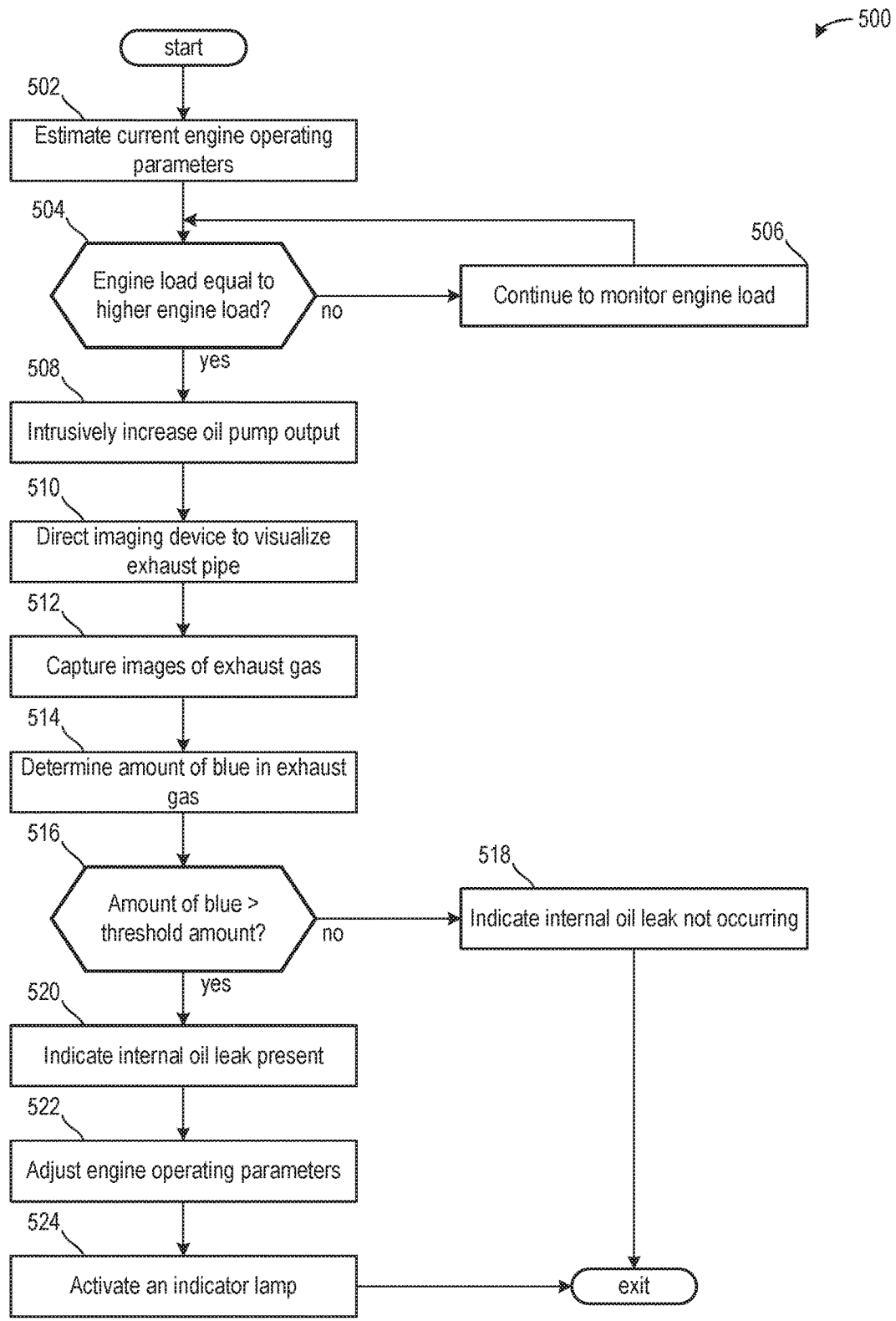
FIG. 5 shows a method for executing an internal oil leak diagnostic.
Figure 6:
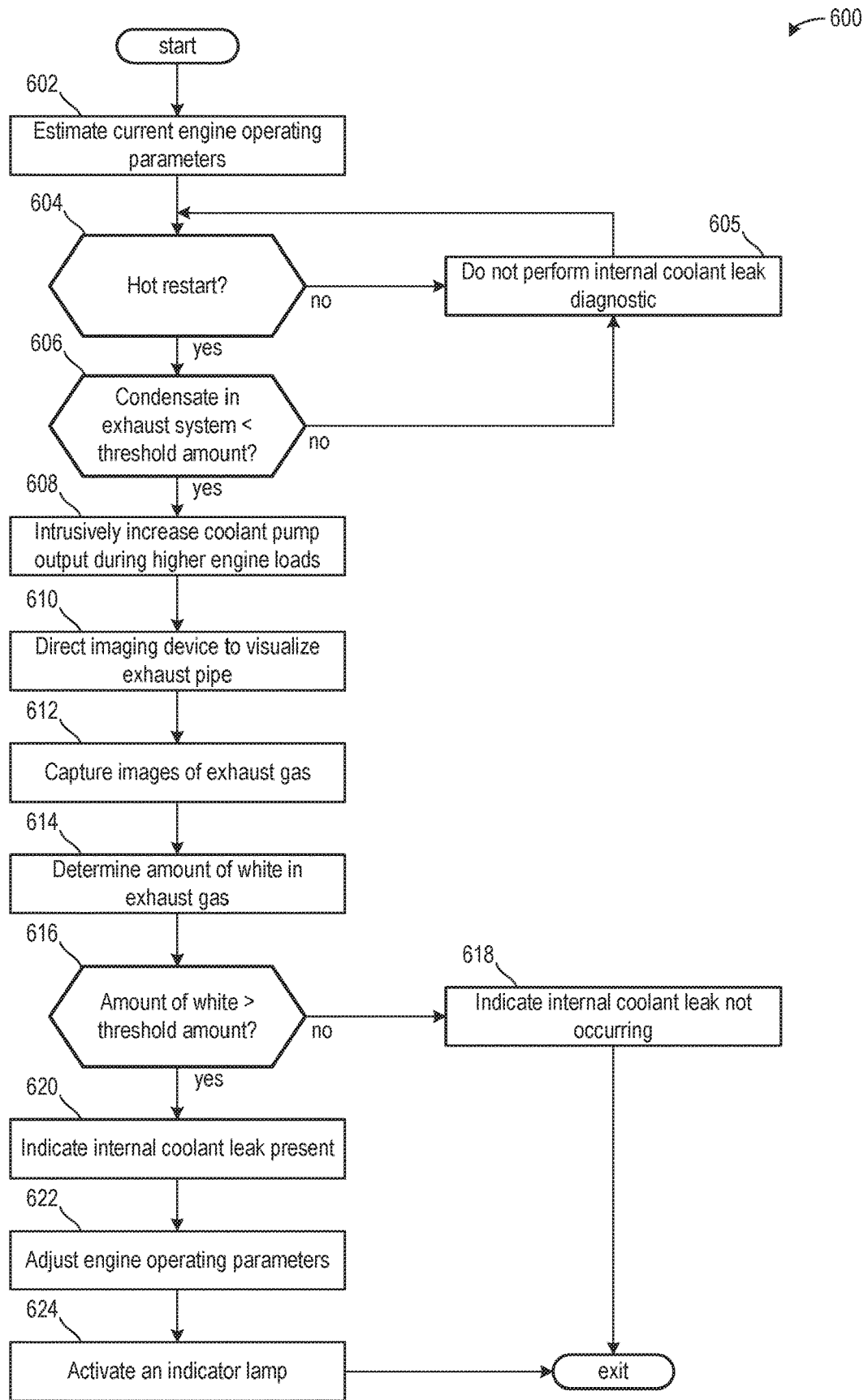
FIG. 6 shows a method for executing an internal coolant leak diagnostic.
Figure 7:
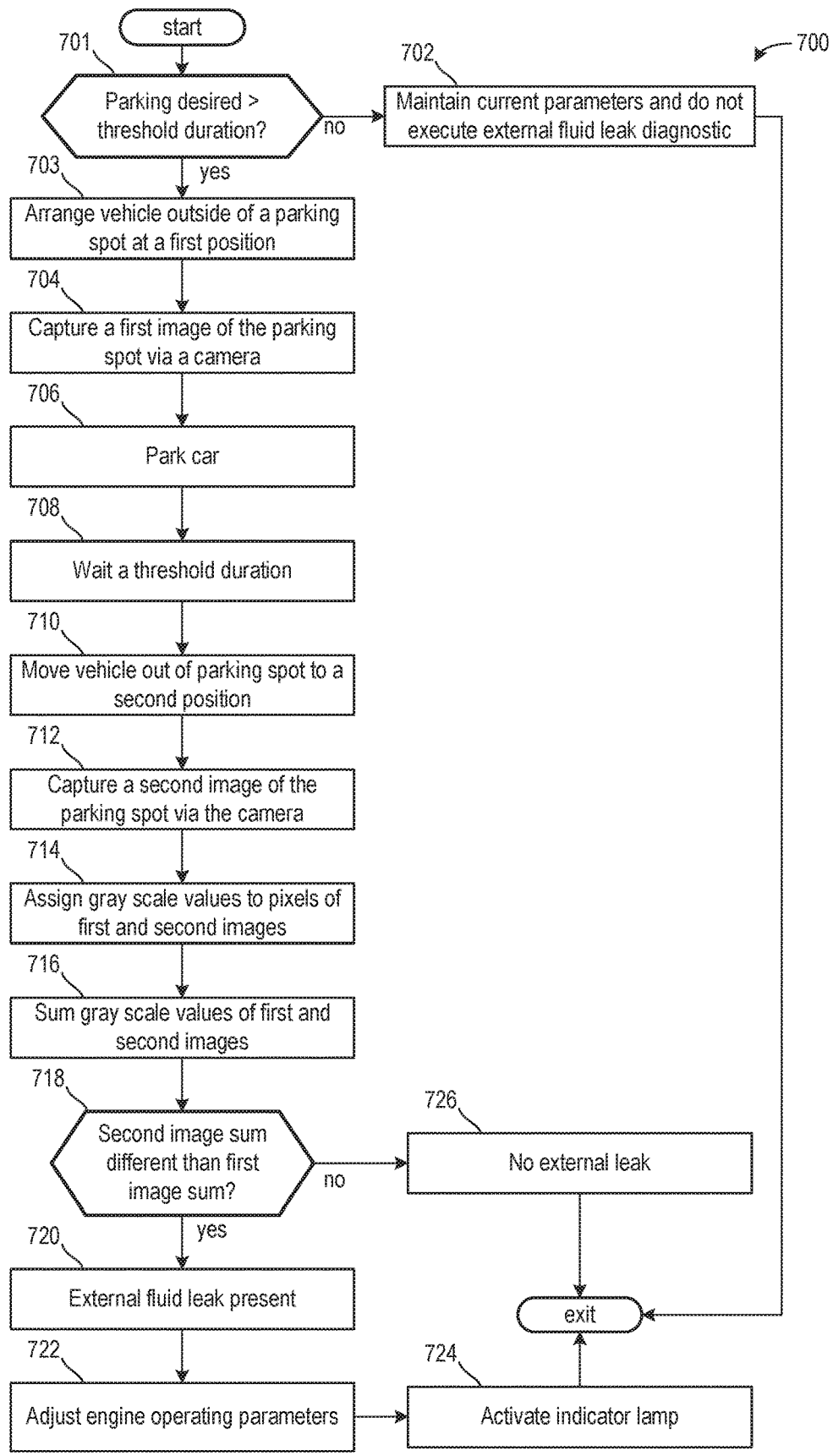
FIG. 7 shows a method for executing an external fluid leak diagnostic.
Figure 8:
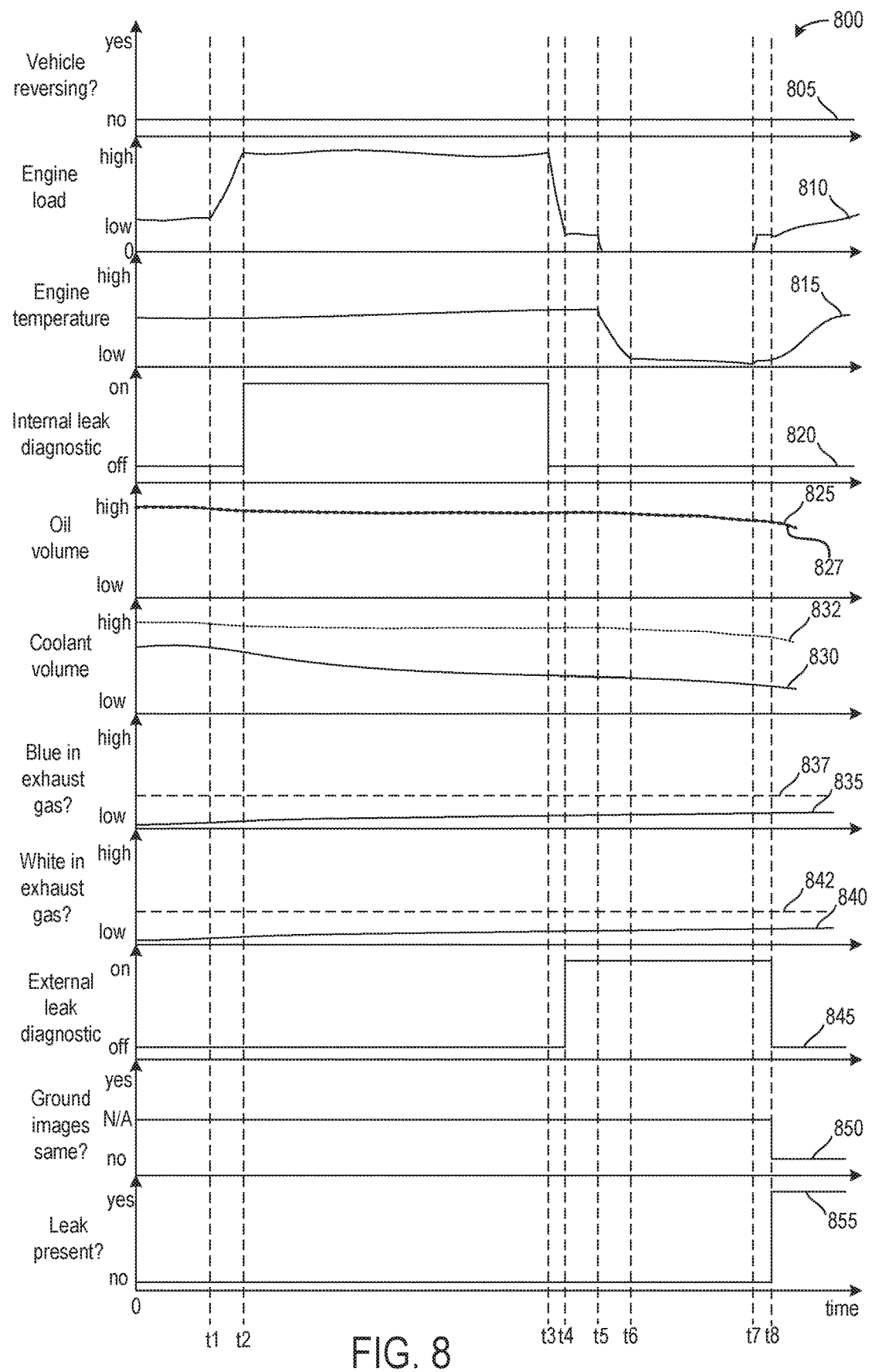
FIG. 8 shows an engine operating sequence illustrating the methods of FIGS. 4, 5, 6, and 7 being executed in combination with the vehicle illustrated in FIGS. 1, 2, and 3.

A method for executing the internal fluid leak diagnostic may include intrusively increasing a displacement of a fluid pump during a high load is shown in FIGS. 5 and 6. A method for executing the external fluid leak diagnostic may include deliberately stopping the vehicle short of a parking spot at a first position, capturing a first image of the parking spot, parking in the parking spot for a threshold duration, propelling the vehicle out of the parking spot to a second position, capturing a second image of the parking spot, and comparing a grayness of the second image to the first image to determine if an external fluid leak is present is shown in FIG. 7. FIG. 8 shows an engine operating sequence illustrating the methods of FIGS. 4, 5, 6, and 7 being executed in combination with the vehicle illustrated in FIGS. 1, 2, and 3.

If the fluid leak is present, then one or more engine operating parameters may be adjusted based on a location of the leak (e.g., internal versus external) and a type of the fluid leaking (e.g., oil versus coolant). For example, the image capturing device may present a live feed of the exhaust gas onto a screen of an infotainment system. Additionally, an indicator lamp may be activated to indicate to a vehicle operator that maintenance is desired. Furthermore, one or more engine operating parameters may be adjusted to mitigate and/or prevent the fluid leak.

FIGS. 1 and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an example of a cylinder of internal combustion engine 10 included in engine system 7 of vehicle 5. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

One or more portions of the crankshaft 140 may be lubricated via oil housed in a crankcase 82. The crankcase 82 may be sized such that the crankshaft 140 may be actuated according to a full oscillation of the piston (e.g., from TDC to BDC or vice-versa). The crankcase 82 may be further coupled to a lubrication system of the engine. Thus, oil or other lubricants may enter and depart the crankcase 82. A sensor 84 may be configured to monitor a condition of the crankcase 82 and provide feedback to the controller 12. The sensor 84 may be configured to monitor one or more of a pressure, temperature, humidity, and the like. Herein, the sensor 84 is an oil sensor.

Cylinder 14 can receive intake air via a series of intake air passages 142, 144, and 146. Intake air passage 146 can communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three-way catalyst (TWC), NOx trap, various other emission control devices, or combinations thereof.

In some examples, an exhaust tuning valve may be arranged between the turbine 176 and the emission control device 178. The exhaust tuning valve may be actuated to adjust exhaust backpressure. For example, the exhaust tuning valve may be configured to partially obstruct the exhaust passage 148 such that less exhaust gas may flow past the exhaust tuning valve. The exhaust tuning valve may be actuated to more closed positions to increasingly obstruct the exhaust passage 148. In turn, this may increase the exhaust backpressure, which may decrease a likelihood of oil leaking from the crankcase 82 to the cylinder 14.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Lubricated portions of the engine system 7 may include the turbocharger 175, the intake valve 150, the exhaust valve 156, and the crankshaft 140. Each of these components may be prone to degradation, wherein the degradation may include an oil leakage. For example, compressor bearings may be lubricated to mitigate metal on metal contact. However, due to high rotation speeds of the compressor (e.g., 20,000 revolutions-per-minute), the oil may get foamy. If the oil remains foamy upon return to an oil reservoir, then a pump may be unable to flow the oil to the compressor bearing. This may result in metal on metal contact, which may lead to a crack or hole. This may leak oil upon a future lubrication of the compressor bearing, thereby leading to oil flowing to the cylinder 14.

As another example, the crankcase 82 may flow oil into the cylinder 14 during some engine operating conditions. For example, if a crankcase pressure is within a threshold pressure of a current exhaust gas pressure, then oil from the crankcase 82 may flow past the piston 138 and into the cylinder 14. The crankcase pressure may be estimated based on feedback from the sensor 84 to the controller 12. To prevent oil flowing from the crankcase 82 to the cylinder 14, one or more engine operating parameters may be adjusted to increase an exhaust gas temperature and/or decrease the crankcase pressure.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from an energy storage device 58 (herein, battery 58) to provide torque to vehicle wheels 55. Electric machine 52 may also be operated as a generator to provide electrical power to charge battery 58, for example during a braking operation. In some examples, the electric machine 52 may be coupled to the turbine 176, as will be described in greater detail below.

The controller 12 receives signals from the various sensors of FIG. 1 and employs the various actuators of FIG. 1 to adjust engine operation based on the received signals and instructions stored on a memory of the controller. For example, adjusting engine operating parameters may include adjusting an actuator of the exhaust valve 156, an actuator of the spark plug 192, and an actuator of the fuel injector 166 in response to determining a fluid leak in the engine system 7, wherein the fluid leak may leak oil and/or coolant.

FIG. 2 illustrates an example vehicle propulsion system 200. Vehicle propulsion system 200 includes a fuel burning engine 210 and a motor 220. As a non-limiting example, engine 210 comprises an internal combustion engine and motor 220 comprises an electric motor. Engine 210 and motor 220 may be used substantially similarly to engine 10 and electric machine 52 of FIG. 1, respectively. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle (e.g., vehicle 5 of FIG. 1) with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

In another example, the engine may be equipped with a start/stop (S/S) feature 293, wherein the engine 210 may be automatically shut down during times when the vehicle is not moving, or when the vehicle speed is below a threshold speed, when engine speed is below a threshold engine speed, etc. Control system 290 may be connected to engine 210 and S/S feature 293, for performing the start-stop functions. Advantages to the S/S functionality may include an improvement in fuel economy over other vehicles that do not employ such technology. During the start/stop the vehicle may be propelled via its momentum and not by the engine 210 or the motor 220.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, which will be discussed in further detail below, motor 220 may be configured to rotate engine unfueled in a forward (e.g. default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnect between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art.

Vehicle system 200 may also include an on-board navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example.

Turning now to FIG. 3, it shows an embodiment 300 of the vehicle 5. As such, components previously introduced may be similarly numbered in subsequent figures. The vehicle 5 is shown having its wheels 55 arranged on a ground. The vehicle 5 may comprise one or more of an infotainment system, a navigation system, and an entertainment system arranged within a vehicle cabin where vehicle occupants may reside.

An axis system 390 is shown comprising two axes, namely an x-axis parallel to a horizontal direction and a y-axis parallel to a vertical direction. A direction of vehicle movement 392 may be substantially parallel to the x-axis. Specifically, the direction of vehicle movement 392 illustrates a forward direction of vehicle movement. The forward direction may be achieved when the vehicle is in a "drive" gear. The drive gear may include a vehicle transmission being in a first gear or higher. Thus, the drive gear may not be in a reverse gear when the vehicle 5 is moving in the forward direction 392. As an example, the vehicle 5 may move in a direction opposite the forward direction 392 when the vehicle 5 is in a reverse gear.

The vehicle 5 is further illustrated comprising an oil pan 302. A volume sensor 304 may be coupled to the oil pan 302, wherein the volume sensor 304 may provide feedback to a controller (e.g., controller 12 of FIG. 1) regarding a volume of oil in the oil pan 302.

The vehicle 5 may further comprise a radiator 306 and a coolant sensor 308. The coolant sensor 308 may provide feedback to a controller (e.g., controller 12 of FIG. 1) regarding a volume of coolant in a coolant system of the vehicle 5. In some examples, additionally or alternatively, the coolant sensor 308 may be located in a different portion of the coolant system (e.g., a degas bottle, coolant jacket, and the like).

The vehicle 5 may emit exhaust gas 312 through one or more tailpipes 314 when an engine (e.g., engine 10 of FIG. 1) is combusting. An image of the exhaust gas 312 may be captured by an image capturing device 316. The image capturing device 316 may be a camera and/or video recorder arranged on a rear of the vehicle. The image capturing device 316 may be one or more of a reverse camera, blind-spot camera, and bird's eye view camera. The bird's eye view camera may include a plurality of cameras, arranged along a periphery of the vehicle, configured to capture a 360° image of the vehicle such that an overhead view of the vehicle may be generated. In this way, the image capturing device 316 may be a single camera of a plurality of cameras arranged on a rear of the vehicle 5. At any rate, the image capturing device 316 may be a camera arranged on a rear of the vehicle 5, wherein the camera may comprise a function other than imaging exhaust gas 312. In some examples, the image capturing device 316 may be an image capturing device solely devoted to imaging exhaust gas and may not provide any other function.

Herein, the image capturing device 316 is a reverse camera, wherein the camera is configured to capture a surrounding area adjacent the vehicle 5. More specifically, the image capturing device 316 may capture a first surrounding area when the vehicle 5 is in a reverse gear. The first surrounding area may comprise an area within 0.1 to 4 meters away from the rear end of the vehicle 5. As such, the tailpipe(s) 314 and exhaust gas 312 may not be included in the image of the first surrounding area. Outside of the reverse condition, the image capturing device 316 may capture a second surrounding area, wherein the second surrounding area may comprise an area less than 0.5 meters away from the rear end of the vehicle 5. Thus, the tailpipe(s) 314 and the exhaust gas 312 may be included in the second surrounding area. Outside of the reverse driving condition also refers to a non-reverse driving condition.

In some examples, a number of image capturing devices 316 may be equal to a number of tailpipes 314. Thus, if there are two tailpipes 314, then there may be two image capturing devices 316. In some examples, there may be only one image capturing device of the image capturing devices 316, regardless of a number of tailpipes 314. The one image capturing device may be able to visualize exhaust gas being emitted from each of the tailpipes 314. As such, the one image capturing device may be arranged in a location between the tailpipes 314. In some examples, the image capturing devices 316 may be arranged at a rear bumper, adjacent a license plate, adjacent a rear door, and/or adjacent one or more taillights. The rear door may be a door which provides access to a vehicle trunk or to a vehicle engine, depending on a layout of the vehicle (e.g., front engined or rear engined, respectively). For a vehicle with the engine adjacent its front wheels, the rear door may open to a trunk, where the vehicle operator may store one or more items.

The image capturing device 316 may comprise one or more features configured to assist the image capturing device 316 to capture an image of the exhaust gas 312 with increased quality. These features may include one or more of a servomotor, infrared, and light. For example, the servomotor may allow the image capturing device 316 to rotate, thereby increasing an imaging range of the image capturing device 316. In this way, the image capturing device 316 may not be fixed, but rather, may be able to rotate around and within a 360° plane. In some examples, additionally or alternatively, the image capturing device 316 may comprise infrared features such that the image capturing device 316 may capture images during nighttime. This may be beneficial during instances where the taillights are not bright enough or when the taillights are not illuminating a desired area. In this way, the image capturing device 316 may not be reliant on the taillights to capture a quality image, wherein the quality image may sufficiently focus on exhaust gas. This may include determining that a color saturation of an image will be greater than a threshold quality, which may be based on a non-zero value. If the color saturation is less than the threshold quality, then the infrared may be activated and/or the camera may be actuated by a controller signal to an actuator of the servomotor to actuate the camera. In one example, the threshold quality is based on a confidence factor calculated based on images captured by the image capturing device 316 compared to images captured by a camera and/or video that is not coupled to the vehicle 5.

The image capturing device 316 may capture images of the exhaust gas 312 during some engine operating parameters. As an example, the image capturing device 316 may capture images of the exhaust gas during engine conditions outside of a reverse condition. This may include engine stops, idle, low load, high load, and the like. Thus, the image capturing device 316 may function as a reverse camera during a reverse operation of the vehicle 5, while operating as an exhaust gas visualization device during other engine operating conditions. In this way, the image capturing device 316 may be configured to display an image of a surroundings of the vehicle 5 or an image of the exhaust gas 312 to a screen in the vehicle 5. The screen may be included in a navigation system and/or infotainment system of the vehicle 5, wherein the screen is arranged in the vehicle cabin for the vehicle occupants to see. Additionally or alternatively, the image may be sent to a mobile device belonging to the vehicle operator.

The image of the exhaust gas 312 may be captured by the image capturing device 316, wherein the image may be processed via routine stored in non-transitory memory of a controller (e.g., controller 12 of FIG. 1). The routine, such as the methods of FIGS. 5 and 6, may apply one or more filters to the image to determine a color of the exhaust gas 312. Based on a determined color, the routine may be able to diagnose one or more leaks of engine components, if any. As an example, if the exhaust gas comprises a threshold amount of blue, then oil may be leaking internally through one or more of a valve seal, a piston ring, and/or a turbo seal. Additionally, a time at which the exhaust gas is imaged may be characteristic of certain types of leaks. Continuing with the example above, if a threshold amount of blue is in the exhaust gas during an engine start, then it may be determined that oil is leaking through the valve seal. However, if the exhaust gas is blue outside of the engine start, then it may be determined that oil is leaking past the piston ring. Methods for executing oil leak diagnostics are described in greater detail below.

As another example, additionally or alternatively, if the exhaust gas comprises a threshold amount of white, then coolant may be leaking internally through one or more of an engine head gasket, engine cylinder head, and engine block.

The vehicle 5 further comprises a front camera 322. In some examples, the front camera 322 may be configured to detect a proximity between the vehicle 5 and an object directly ahead of the vehicle. Additionally, the front camera 322 may be configured to capture images of a parking spot during some fluid leak diagnostics to determine if a fluid leak is occurring externally. This may include arranging the vehicle in a first position outside of a parking position to capture a first image of the parking position. The first position may be a length of the vehicle outside of the parking position, wherein the length may be measured in a longitudinal direction parallel to the x-axis if the vehicle is parking head-first or rear-first. If parking head-first, the front camera 322 may be used to capture the images of the parking spot. If parking rear-first, the rear camera 316 may be used to capture the images of the parking spot. The external fluid leak diagnostic is described in greater detail with respect to FIG. 7.

Turning now to FIG. 4, it shows a high-level flow chart illustrating a method 400 for executing a fluid leak diagnostic in response to a rate of fluid volume reduction. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 begins at 402, which includes determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio.

The method 400 may proceed to 404, which may include estimating a rate of fluid decrease. The rate of fluid decrease may be based on feedback provided from a fluid sensor. Additionally or alternatively, the rate of fluid decrease may correspond to a single fluid such that volume changes of different fluids are not combined. Thus, a rate of decrease of oil may not affect a determination for a rate of decrease of coolant. For example, an oil sensor arranged in an oil pan (e.g., oil pan 302 and oil volume sensor 304 of FIG. 3) may provide feedback regarding a volume of oil in the oil pan. It will be appreciated by those of ordinary skill in the art that oil sensors arranged in other areas of the vehicle that receive lubrication may provide similar feedback regarding a volume of oil in the vehicle. In some examples, the feedback from the various oil sensors may be cross-referenced to determine an average rate of oil volume decrease. As another example, additionally or alternatively, a coolant sensor arranged in a coolant system (e.g., coolant sensor 308 arranged in radiator 306) may provide feedback regarding a volume of coolant in the coolant system. In some examples, feedback from the coolant sensor in the radiator may be cross-referenced with feedback from another coolant sensor, for example a coolant sensor coupled to a coolant jacket. At any rate, the rate of fluid decrease may be estimated and/or calculated via determining a difference in the fluid volume over time.

The method 400 may proceed to 406, which may include determining if the rate of fluid decreasing is greater than a threshold rate. The threshold rate may be based on an expected rate of fluid reduction when a fluid leak is not present. Thus, a fluid leak may be present if the rate of fluid decreasing is greater than the threshold rate.

If the rate of one or more fluids decreasing is not greater than the threshold rate, then the method 400 may proceed to 408 which may include maintaining current engine operating parameters and does not execute the fluid leak diagnostic.

However, if the rate of at least one fluid (e.g., oil and/or coolant) decreasing is greater than the threshold rate, then the method 400 may proceed to 410 which may include executing a fluid leak diagnostic. The fluid leak diagnostic may include adjusting one or more engine operating parameters to determine if a fluid leak is present. The fluid leak diagnostic may include an internal fluid leak diagnostic and an external fluid leak diagnostic, each optionally configured to determine a fluid leak without assistance from a human vehicle operator when desired.

The method 400 may proceed to 412, which may include opportunistically executing one of the internal fluid leak diagnostic or the external fluid leak diagnostic depending on conditions being met. Conditions for the internal fluid leak diagnostic may include a high engine load and conditions for the external fluid leak diagnostic may include a desire to park the vehicle. During some operations of the vehicle, the internal fluid leak diagnostic conditions may be met prior to the external fluid leak diagnostic conditions such that the internal and external diagnostics may be executed in succession of one another. In some examples, additionally or alternatively, the diagnostics may be executed separately from one another such that engine conditions where a fluid leak diagnostic is not occurring may be present between execution of the internal and external diagnostics. The internal oil leak diagnostic is described in more detail with respect to FIG. 5. The internal coolant leak diagnostic is described in more detail with respect to FIG. 6. The external fluid leak diagnostic is described in more detail with respect to FIG. 7. Each of the internal fluid leak diagnostic and the external fluid leak diagnostic may determine if a fluid leak is occurring independent of the type of fluid. That is to say, if oil is leaking and coolant is not leaking, or vice-versa, then the internal and external fluid leak diagnostics may still determine a fluid is leaking and the type of fluid that is leaking, as will be described below. Additionally or alternatively, an internal fuel leak diagnostic may also be executed. In one example, execution of the internal fluid leak diagnostics (e.g., internal coolant, oil, and fuel diagnostics) may be prioritized based on one or more of entry conditions being met and feedback from a corresponding sensor indicating a rate of fluid decrease being greater than a threshold rate.

In one example, the internal oil leak diagnostic may be executed prior to the internal coolant leak diagnostic, which is executed prior to the external fluid leak diagnostic for a single drive cycle. Additionally or alternatively, the internal oil leak diagnostic, internal coolant leak diagnostic, and external fluid leak diagnostic may be executed separately over two or more drive cycles.

The method 400 may proceed to 414, which may include determining if the internal and/or external fluid leak(s) are/is occurring. If at least one of the fluid leaks is determined to be present, then the method 400 may proceed to 416, which may include adjusting engine operating parameters based on the fluid leak. For example, if the fluid leak is an internal oil leak, then the method 400 may include adjusting boost. However, if the fluid leak is an internal coolant leak, then the method 400 may include decreasing engine power output.

If no fluid leaks are present, then the method 400 may proceed to 418, which may include indicating a fluid sensor is degraded. Thus, the fluid sensor may not accurately sense a volume of the oil. For example, if an oil sensor indicated previously that the rate of oil decreasing was greater than the threshold rate, but the internal and external fluid leak diagnostics did not determine an oil leak, then the oil sensor may be degraded Following 416 or 418, the method 400 may proceed to 420, which may include activating an indicator lamp. Activating the indicator lamp may include lighting up the indicator lamp arranged on a dashboard of the vehicle. Activating the indicator lamp may further include signaling to a wireless network an indication of the degradation of the vehicle, including the oil leak or the degraded oil sensor. If the vehicle is included in a car sharing model, where a plurality of users from different households operate the vehicle, the vehicle may be decommissioned until service is received. If the vehicle is an autonomous vehicle owned by a user or a plurality of users within a shared household, then the vehicle may limit engine torque until service is received.

Turning now to FIG. 5, it shows a method 500 for executing the internal oil leak diagnostic. In some examples, determination of a positive crankcase ventilation (PCV) valve not being degraded may occur prior to execution of the method 500. The PCV valve may be diagnosed based on feedback from a CkCp sensor.

The method 500 begins at 502, which includes determining, estimating, and/or measuring current engine operating parameters, similar to 402 of method 400 of FIG. 4.

The method 500 may proceed to 504, which may include determining if the engine load is a higher load, which may include a mid-load or a high-load. In some examples, engine load may increase due to a downshift. Other examples of an increase in engine load may include a hard tip-in and driving up a steep hill. If the engine load is not increasing to a mid or higher load, then the method 500 may proceed to 506 to continue to monitor the engine load until the engine load increases to a mid or higher load.

If the engine load is increasing to a mid- or higher load, then the method 500 may proceed to 508, which may include intrusively increasing an oil pump displacement to a high displacement. During engine conditions where the internal oil leak diagnostic is not occurring, the oil pump displacement may be proportional to engine speed, wherein a displacement of the oil pump is low when engine speed is low. However, when executing the internal oil leak diagnostic, the displacement of the oil pump is intrusively increased to a high displacement, when the displacement of the pump would otherwise be low. In one example, the displacement of the oil pump during the internal oil leak diagnostic is a maximum displacement of the oil pump. By increasing the displacement of the pump, blue exhaust gas generated from burning internally leaked oil may be accelerated. The oil pump may be coupled to an electric motor, secondary actuator different than the internal combustion engine, or the like in order to increase the displacement of the oil pump independent of engine speed during the internal oil leak diagnostic.

The method 500 proceeds to 510, which may include directing an image capturing device to visualize an exhaust pipe. In some examples, the image capturing device may be a rear image capturing device arranged on a servomotor configured to rotate the rear image capturing device when desired. By aiming the rear image capturing device such that the exhaust pipe may be visualized, exhaust gas expelled from the exhaust pipe may also be visualized.

The method 500 proceeds to 512, which may include capturing images of the exhaust gas. The images may be stored in a look-up table or other database.

In some examples, a first image of the exhaust gas prior to the increase of the oil pump displacement may be captured and compared to second images captured of the exhaust gas following the increase of the oil pump displacement.

The method 500 proceeds to 514, which may include determining an amount of blue in the exhaust gas. In some examples, determining the amount of blue in the exhaust gas may include an algorithm scanning the images for blue/white smoke via integrating multiple exhaust gas images over time (e.g., 1-2 seconds). The algorithm may then covert the images into a frequency domain via Fast Fourier Transform (FFT). The integrated image and band pass through only frequencies associated via smoke color "blue" (e.g., 610 to 670 THz). In other examples, the images may also be integrated over time and then may be passed through a match filter comparing the integrated image to a pre-defined frequency spectrum representation of a blue or white smoke image comparing a 3 db width of a cross-correlation to a threshold frequency domain amplitude.

The method 500 proceeds to 516 which may include determining if an amount of blue is greater than a threshold amount of blue. Continuing with the examples provided above at 514, the threshold amount of blue may be substantially equal to the threshold frequency domain amplitude. In other examples, the threshold amount of blue may be based on a concentration of blue in exhaust gas during engine conditions where an internal leak is not present. The threshold amount of blue may be a non-zero number. Additionally or alternatively, the threshold amount of blue may be based on an amount of blue present in the exhaust gas prior to increasing the oil pump output. As such, even if an oil leak was present prior to the oil pump output increase, the internal oil leak may still be detected due to more oil leaking internally, resulting in an increased amount of blue in the exhaust gas.

If the amount of blue in the exhaust gas is not greater than the threshold amount of blue, then the method 500 may proceed to 518, which may include indicating that an internal oil leak is not occurring. With respect to FIG. 4, if the internal oil leak diagnostic is executed before the external oil leak diagnostic, then the result of the internal oil leak not being present may be stored in memory and compared to a result of the external oil leak diagnostic. Additionally or alternatively, the internal oil leak diagnostic may not be re-executed until the external oil leak diagnostic is executed. Said another way, the internal and external oil leak diagnostics are executed alternatingly.

If the amount of blue in the exhaust gas is greater than the threshold amount of blue, then the method 500 may proceed to 520, which may include indicating an internal oil leak is present. In some examples, a difference between the amount of blue in the exhaust gas and the threshold amount of blue may be calculated, where the difference may be correlated to the rate of oil volume decrease. That is to say, examples of the method 500 may further include following determination of the internal oil leak, estimating if the internal oil leak accounts for an entirety of the rate of oil volume decrease or if an external oil leak may also be present. Thus, in some embodiments, additionally or alternatively, if the internal oil leak accounts for the entirety of the rate of oil volume decrease, then the external oil leak diagnostic may be avoided (e.g., not executed) and the oil sensor may be determined to not be degraded.

The method 500 may proceed to 522, which may include adjusting one or more engine operating parameters to decrease an amount of oil leaking from the internal oil leak until service can be received. Causes for the internal oil leak may include one or more of degraded piston rings, degraded positive crankcase ventilation valve, degraded cylinder head valve guides, scored cylinders from lack of lubrication, and degraded turbo seal. Adjusting one or more engine operating parameters may include one or more of delaying an exhaust valve opening, retarding spark, closing a turbocharger wastegate, opening a compressor bypass valve, and moving an exhaust tuning valve to a more closed position. By doing this, an exhaust gas pressure may increase to a pressure greater than a crankcase pressure, which may at least mitigate the internal oil leak during a plurality of engine conditions including boosted and non-boosted engine conditions.

The method 500 may proceed to 524 to activate an indicator lamp. Additionally or alternatively, the vehicle, whether autonomous or used in a car sharing model, may signal to a central server than maintenance is required. As such, a service member may travel to the vehicle and address the internal oil leak or may schedule a service time for the vehicle to receive service.

Turning now to FIG. 6, it shows a method 600 for executing an internal coolant leak diagnostic. The method 600 may be executed before, after, or during the method 500. In some examples, the method 500 may be executed prior to the method 600 to ensure that entry conditions to the internal coolant leak diagnostic are met. The method 500 may increase engine operating temperatures to desired operating temperatures corresponding to a hot engine start and the method 500 may further clear condensate in an exhaust system, which may prevent interference in analyzing the exhaust gas.

In some examples, coolant may leak internally in response to a head gasket, which physically couples the cylinder head and engine block being degraded. Degradation may include cracks, holes, or the like.

The method 600 begins at 602, which includes determining, estimating, and/or measuring current engine operating parameters, similar to 402 of method 400 of FIG. 4.

The method 600 may proceed to 604, which may include determining if an engine restart is a hot restart. The engine restart may be a hot restart if a coolant temperature is equal to or greater than a desired temperature, wherein the desired temperature may be based on a desired engine operating temperature (e.g., 180 to 220° F.). In some examples, additionally or alternatively, the engine restart may be a hot restart if the coolant temperature is greater than or equal to an ambient temperature.

If the engine restart is a not a hot restart, then the method 600 may proceed to 605, which includes not performing the internal coolant leak diagnostic. If the engine restart is a hot engine restart, then the method 600 may proceed to 606, which may include determining if an amount of condensate in the exhaust system is less than a threshold amount of condensate. Condensate in the exhaust system may be expelled with exhaust gas, wherein the condensate may convert to steam, thereby increasing an amount of white in the exhaust gas. Images captured of exhaust gas smoke may not be filtered in a way to differentiate if white in the smoke is from coolant or condensate. As such, the method 600 may proceed to 605 if the condensate in the exhaust system is not less than the threshold. By doing this, the internal coolant leak diagnostic is not executed, which may prevent misdiagnosis of an internal coolant leak due to condensate being swept from an exhaust passage.

If the condensate in the exhaust system is less than the threshold amount, then the method 600 may proceed to 608, which may include intrusively increasing the coolant pump output during higher engine loads, similar to 508 of method 500 of FIG. 5. In one example, the coolant pump output is increased to a maximum output. In another example, the coolant pump output is increased to a maximum tolerable output based on current engine operating parameters. By doing this, an internal coolant leak may be exaggerated and more easily identified. Said another way, an amount of white in the exhaust gas may increase due to the increased coolant pump output, which may be independent of engine operating parameters. By increasing the amount of white, a change in exhaust gas may be more noticeable during the internal coolant leak diagnostic, thereby increasing a confidence in a result obtained.

The method 600 may proceed to 612, which may include capturing images of the exhaust gas. 612 of method 600 may be substantially similar to 512 of method 500 of FIG. 5.

The method 600 may proceed to 614, which may include determining an amount of white in the exhaust gas. In some examples, determining the amount of white in the exhaust gas may include an algorithm scanning the images for white smoke via integrating multiple exhaust gas images over time (e.g., 1-2 seconds). The algorithm may then covert the images into a frequency domain via Fast Fourier Transform (FFT). The integrated image and band pass through only frequencies associated with white smoke. In other examples, the images may also be integrated over time and then may be passed through a match filter comparing the integrated image to a pre-defined frequency spectrum representation of a white smoke image comparing a 3 db width of a cross-correlation to a threshold frequency domain amplitude. In one example, white light may be detected by measuring an average of a frequency of a plurality of colors. For example, the frequency measured for white light may be between 540 to 600 THz (515 to 570 nm).

The method 600 may proceed to 616, which may include determining if the amount of white is greater than a threshold amount of white. The threshold amount of white may be determined during engine operating conditions where condensate in the exhaust system is less than the threshold amount and where an internal coolant leak is not occurring. Additionally or alternatively, the threshold amount of white may be equal to an amount of white in the first image captured of exhaust gas prior to intrusively increasing the coolant pump output. In this way, even if an internal coolant leak is present, the amount of white in the second image following the increase in the coolant pump output may be higher than the amount of white in the first image. If the amount of white is not greater than the threshold amount of white, then the method 600 may proceed to 618, which may include indicating that an internal coolant leak is not occurring.

If the amount of white in the second exhaust gas image is greater than the threshold amount of white, then the method 600 may proceed to 620 to indicate an internal coolant leak is present.

The method 600 may proceed to 622, which may include adjusting one or more engine operating parameters in response to the internal coolant leak. In some examples, the adjusting may be to decrease engine operating temperatures. This may include decreasing boost, decreasing a fuel injection amount, retarding a spark timing, and the like. Furthermore, engine power output may be reduced and/or limited. Additionally or alternatively, the engine operating parameters may be adjusted to maintain combustion stability in light of the coolant reaching the combustion chamber. As such, an air/fuel ratio, spark timing, fuel timing, and injection amount may be adjusted to maintain a combustion stability despite coolant being combusted.

The method 600 may proceed to 624, which may include activating an indicator lamp, similar to 524 of method 500 described above.

In some embodiments, a method may include executing an internal fuel leak diagnostic. Entry conditions for the internal fuel leak diagnostic may include a cold-start following an overnight soak. In one example, the overnight soak may include the engine remaining off for some amount of time such that fuel may drain from the engine and other portions of a fuel system and returned to a fuel tank. Furthermore, by initiating the internal fuel leak diagnostic during a cold-start, fuel may not evaporate. By doing this, an external fuel leak, if present, may not be confused with an internal fuel leak, if present.

Other entry conditions for the internal fuel leak diagnostic may further include feedback from a fuel sensor indicating fuel is decreasing at a rate greater than a threshold rate. The threshold rate may be based one or more of driver behavior, fuel quality, ambient temperatures, and the like. For example, if a volume of fuel in the fuel tank is less than an expected volume, wherein the expected volume is estimated based on a previous fill-up, miles driven since the previous fill-up, and auxiliary device consumption since the previous fill-up.

The internal fuel leak diagnostic may begin by priming a fuel rail following start-up of the engine. A closed fuel loop control is activated and the engine is operated around stoichiometry, which may be 14.7:1, in one example. When the vehicle is not reversing, the rear view camera may be directed toward the exhaust pipe and images of the exhaust gas may be captures. The exhaust gas images may be filtered, similar to the filtering described above with respect to methods 500 and 600, to determine an amount of black in the exhaust gas. If the amount of black in the exhaust gas is greater than an expected amount of black, wherein the expected amount is based on stoichiometric combustion, then an internal fuel leak may exist. The internal fuel leak may correspond to a degraded fuel injector which may be leaking or injecting more fuel than commanded. An indicator lamp may be activated.

In some examples, operation of the degraded fuel injector may be adjusted based on a magnitude of the difference between the amount of black in the exhaust gas images and the expected amount. For example, if the amount of black in the exhaust gas images is 10% greater than the expected amount, then future operation of the fuel injector may include commanding the fuel injector to inject 10% less fuel than would ordinarily be commanded, with the knowledge that the fuel injector may be degraded and injecting 10% more fuel than desired. The exhaust gas may continue to be visualized to determine if the correction (e.g., reduction in commanded fuel) is accurate.

Turning now to FIG. 7, it shows a method 700 for executing the external fluid leak diagnostic. The method 700 may opportunistically be executed before or after methods 500 and 600 depending on conditions for the external fluid leak diagnostic being met. In some examples, method 500 may be executed prior to method 700, followed by execution of method 600.

The method 700 begins at 701, which includes determining if parking the vehicle is desired. If the vehicle is an autonomous vehicle, then parking may be desired once the vehicle has reached an intended destination. If the vehicle is driven by a human, then parking may be desired if the vehicle is approaching a parking location, which may be determined via a GPS, navigation, or other location tracking device. Parking the vehicle may further include shutting off the engine of the vehicle. Additionally or alternatively, parking may further include maintaining the vehicle in a parking spot for a threshold duration of time. The threshold duration of time may be greater than at least 30 minutes. In some examples, the threshold duration may be greater than at least two hours, thereby allowing the engine ample time during an engine off soak state.

Thus, in some examples where the vehicle is a plug-in hybrid vehicle, the parking desired conditions may be met during a recharging of a vehicle battery, where the vehicle battery will be fully replenished to 100% recharge. Additionally or alternatively, driver behavior may be tracked over time and the vehicle may intuitively determine if an upcoming parking event meets external oil leak diagnostic conditions. For example, driving at 8 am along a known route may alert the vehicle that a vehicle operator is approaching work and the vehicle may be stationary for greater than the threshold duration of time upon reaching work. As such, the external fluid leak diagnostic may be executed. As another example, for a vehicle participating in a car sharing model, the external fluid leak diagnostic may be executed if a single user has reserved the car for an extended duration (e.g., 12 hours) and has provided a navigation system of the vehicle intended destinations during the extending duration. If the threshold duration of time is available at one of the intended destinations, then the external fluid leak diagnostic may be executed. Additionally or alternatively, the vehicle participating in the car sharing model may execute the external fluid leak diagnostic between different customers using the vehicle.

If parking is not desired or if parking is desired for less than the threshold duration, then the method 700 may proceed to 702, which may include maintaining current parameters and does not execute the external fluid leak diagnostic.

If parking is desired for greater than the threshold duration, then the method 700 may proceed to 703, which may include arranging the vehicle outside of a parking spot at a first position. The first position may be based on one or more of a length of the vehicle and a general direction in which the vehicle will travel to enter the parking spot. For example, if the vehicle is parking head-first or rear-first, then the length of the vehicle may correspond to a longitudinal length of vehicle. However, if the vehicle is parallel parking, then the length of the vehicle may correspond to a lateral length (e.g., a width) of the vehicle. At any rate, the first position may be a position outside of the parking position where the vehicle is arranged such that the vehicle in the first position does not occupy a portion of the parking spot where the vehicle may be situated. The first position may also achieve a desired visualization of the parking spot via one or more image capturing devices arranged on a periphery of the vehicle.

If a human is operating the vehicle, then one or more prompts may be displayed on an infotainment system of the vehicle. For example, a first prompt may alert the user to stop in a position outside of the parking spot. Prompts following the first prompt may guide the user to enter the first position. A final prompt may inform a user to that the vehicle is arranged in the first position and the vehicle should be stopped. If the vehicle is autonomous, then the vehicle may automatically position itself in the first position without input from the user.

The method 700 may proceed to 704, which may include capturing a first image of the parking spot via an image capturing device (e.g., a camera). If the vehicle is parking head-first, then an image capturing device arranged at a front end of the vehicle (e.g., front camera 322 of FIG. 3) may be utilized to capture the first image. If the vehicle is parking rear-first, then an image capturing device arranged at a rear end of the vehicle (e.g., reverse camera 316 of FIG. 3) may be utilized to capture the first image. The first image may serve as a baseline image, wherein the baseline image captures an area of the parking spot free fluids and/or debris which may fall from the vehicle to the parking spot.

In some examples, the first image may not capture an entirety of the parking spot due to one or more obstructions (e.g., other parking vehicles, walls, fixtures, and the like). As such, the first position may be based on arranging the vehicle outside of the parking spot such that an area above which the engine, the transmission, the radiator, the fuel tank, and other components of the vehicle receiving coolant and/or oil and/or fuel may be arranged may be visualized by the image capturing device. The area may be estimated based on a knowledge of a location of the components in the vehicle.

The method 700 may proceed to 706, which may include parking the car. Parking the car may further include shutting-off the engine by removing a key from an ignition of the vehicle, depressing a button, or remote signaling to deactivate the engine.

The method 700 may proceed to 708, which may include waiting the threshold duration. The threshold duration may be an amount of time sufficient enough to allow an engine off soak state, which may allow the engine to cool and oil to pool in the oil pan and coolant to pool in a coolant reservoir and fuel to return to the fuel tank.

The method 700 may proceed to 710 following the threshold duration, which may include moving the vehicle from the parking spot to a second position. The vehicle may do this autonomously or may provide instructions to a human operator. In some examples, the second position may be identical to the first position. In other examples, the second position may be different than the first position. At any rate, the second position may be based on a position outside of the parking spot such that an image capturing device of the vehicle may capture the area of the parking spot above which the components receiving oil and/or coolant may be arranged.

The method 700 may proceed to 712, which may include capturing a second image of the parking spot via the image capturing device. The image capturing device utilized to capture the second image may be identical to the image capturing device utilized to capture the first image if the first and second positions are similar. Additionally or alternatively, the image capturing device used in the second position may be different than the image capturing device used in the first position. For example, a back-up camera may be used in the first position to capture the first image and a front camera may be used in the second position to capture the second image. By basing both the first and second positions on one or more image capturing devices to visualize the area of the parking spot above which the engine and transmission may be arranged when the vehicle is parked, the first and second images may be compared to determine a presence of an external fluid leak.

The method 700 may proceed to 714 to assign gray scale values to pixels of the first and second images. The gray scale values may be numbers selected from a range, wherein lower numbers correlate to pixels being less gray and higher numbers correlate to pixels being more gray. In one example, the range is 1 to 5. A magnitude of gray and/or an amount of gray may be determined based on an absorption of light, wherein less gray pixels may absorb less light and reflect more light and more gray pixels may absorb more light and reflect less light.

The method 700 may proceed to 716, which may include summing the gray scale values of the first and second images to obtain a first image sum and a second image sum. The first image sum may be substantially equal to a sum of the gray scale values assigned to each pixel of the first image. Similarly, the second image sum may be substantially equal to a sum of the gray scale values assigned to each pixel of the second image.

The method 700 may proceed to 718 which may include determining if the second image sum is different than the first image sum. If the second image sum is different than the first image sum, then an external fluid leak may be present and the method 700 may proceed to 720 to indicate an external fluid leak is present. In some examples, the second image sum is greater than the first image sum when an external fluid leak is present.

In some examples of the external fluid leak diagnostic, additionally or alternatively, gray scale values may be summed for different regions of the first and second images. For example, gray scale values corresponding to an area below the radiator may not be combined with gray scale values corresponding to an area below the oil pan or with gray scale values corresponding to an area below the fuel tank. In this way, it may be determined if the external fluid leak is an external oil leak and/or an external coolant leak and/or an external fuel leak. This determination may be further corroborated with feedback from the fluid sensor (e.g., the oil sensor or the coolant sensor). That is to say, if the external fluid leak diagnostic determines that only an external oil leak is occurring, then the determination may be cross-referenced with feedback from the oil sensor indicating a volume of oil is decreasing at greater than a threshold rate.

If the external fluid leak is an oil leak, then the leak may be from one or more of a degraded engine gasket, a degraded oil pan, a degraded oil drain plug, a degraded oil filler cap, and a degraded oil filter. If the external fluid leak is a coolant leak, then the leak may be from one or more of a degraded radiator cap, a degraded degas bottle, a degraded radiator, a degraded coolant hose, a degraded coolant pump, a degraded block freeze plug, a degraded cabin heater core, degraded or loose coolant hoses, and a degraded freeze plug. If the external fluid leak is a fuel leak, then the leak may be from one or more of a degraded fuel tank, a degraded and/or loose fuel line, a degraded fuel filter, a degraded fuel pressure regulator, a degraded fuel rail leak, and a loose FDM unit. Degradation of one or more of the above described components may include one or more of rust, cracks, leaks, holes, and the like, thereby allowing an undesired amount of fluid to flow externally.

The method 700 may proceed to 722 which may include activating an indicator lamp. Activating the indicator lamp may further include signaling to a network that an external fluid leak is occurring.

Returning to 718, if the second image sum is not different than the first image sum, then an external fluid leak may not be occurring and the method 700 may proceed to 724 to indicate that no external fluid leaks are present.

Turning now to FIG. 8, it shows an engine operating sequence 800 illustrating the methods 400, 500, 600, and 700 of FIGS. 4, 5, 6, and 7, respectively, being executed in combination with the vehicle illustrated in FIGS. 1, 2, and 3. Plot 805 illustrates if a vehicle is reversing, plot 810 illustrates an engine load, plot 815 illustrates an engine temperature, plot 820 illustrates if an internal leak diagnostic is being executed, plot 825 illustrates an oil volume and dashed line 827 represents a threshold oil volume, plot 830 illustrates a coolant volume and dashed line 832 represents a threshold coolant volume, plot 835 illustrates an amount of blue in the exhaust gas and dashed line 837 represents a threshold amount of blue, plot 840 illustrates an amount of white in the exhaust gas and dashed line 842 represents a threshold amount of white, plot 845 illustrates if an external fluid leak diagnostic is being executed, plot 850 illustrates if images of the ground are the same, and plot 855 illustrates if a fluid leak is present. Coolant volume and oil volume may be based on feedback from coolant volume and oil volume sensors. Plot 810 may no longer be visible during instances representing where engine load is zero (e.g., when the vehicle is shut-off).

Prior to t1, the vehicle is not reversing (plot 805). As such, the reverse camera may be used to visualize exhaust gas once entry conditions for the internal fluid leak diagnostic are met. The engine load is relatively low (plot 810), and as such, entry conditions to monitor an internal oil and coolant leak are not met. The engine temperature may be equal to a desired engine operating temperature between high and low temperatures (plot 815). The internal fluid leak diagnostic is not being executed. Feedback from an oil volume sensor indicates that the oil volume is decreasing at an expected rate. As such, plot 825 may track and overlap with dashed line 827 when the oil volume is equal to a threshold and/or expected oil volume. Feedback from a coolant volume sensor indicates that the coolant volume is not decreasing at an expected rate. As such, the coolant volume (plot 830) is less than the threshold volume (dashed line 832). The amount of blue and white in the exhaust gas may be unknown as the internal fluid leak diagnostic is not currently being executed (plots 835 and 840, respectively). The external fluid leak diagnostic is not being executed (plot 845) as the vehicle is not parked, indicated by the engine load being greater than 0. Thus, images of the ground (plot 850) are not captured and it is unknown that a leak is present. At any rate, the feedback from the coolant sensor is sufficient to queue an internal fluid leak diagnostic to be executed once conditions are met.

At t1, the engine load begins to increase to a higher load. The engine temperature may remain between the relatively high and low engine temperatures. Since the vehicle is already running at the beginning of the engine operating sequence 800, condensate in the exhaust system may not be a concern for initiating the internal coolant leak diagnostic as condensate therein may likely already be swept out of the exhaust system. However, condensate may be tracked more closely if an internal coolant leak diagnostic is queued for execution and an engine start has subsequently occurred.

Between t1 and t2, the engine load continues to increase to a higher engine load. At t2, the engine load is equal to a higher engine load, which may include mid and high engine loads. As such, entry conditions for the internal fluid leak diagnostics, which includes the internal oil and coolant leak diagnostics, are met.

Between t2 and t3, the internal fluid leak diagnostic may include capturing first images of the exhaust gas before a displacement pump output is intrusively increased. In the example shown, the internal oil and internal coolant leak diagnostics are executed somewhat simultaneously. Thus, the colors in the exhaust gas may be filtered from one another such that blue generated from burning oil may not interfere with measuring white from burning coolant or vice-versa. However, it will be appreciated that the internal oil and coolant leak diagnostics may be executed separated without departing from the scope of the present disclosure. The first images may provide a baseline of an amount of white or blue in the exhaust gas. Following increasing the displacement output of the oil and coolant pumps, second images of the exhaust gas may be captured. As such, if an internal fluid leak is occurring, the amount of blue and/or white in the exhaust gas may increase due to the increased output of the oil and coolant pumps. During the internal fluid leak diagnostic of FIG. 8, the amount of blue in exhaust gas and the amount of white in exhaust gas remain relatively constant and below their respective threshold amounts. At t3, the internal fluid leak diagnostic may be terminated and a leak is still not indicated as being present. As such, if a leak is present, the leak may be an external leak. Otherwise, the coolant volume sensor may be degraded and may be providing inaccurate feedback regarding the coolant volume.

Between t3 and t4, conditions for the external fluid leak diagnostic are not met as the vehicle is not being parked. At t4, parking is desired and conditions for the external fluid leak diagnostic are met. Between t4 and t5, the external fluid leak diagnostic may slightly delay the vehicle from being shut-off as the vehicle is arranged in a first position outside of a parking spot to allow imaging devices on the vehicle to capture first images various positions of the parking spot that may be positioned directly below one or more of a coolant reservoir, oil pan, engine, transmission, and other components. Once the images are captured, the vehicle may park and be shut-off.

At t5, the vehicle is parked and the engine is shut-off. The engine load decreases to substantially zero. The engine temperature begins to decrease. Between t5 and t6, the external leak diagnostic may include waiting a threshold duration to allow the engine temperature to decrease to an ambient temperature to allow the coolant and oil to sufficiently pool in their respective receptacles (e.g., coolant reservoir and oil pan, respectively).

At t6, the engine temperature is relatively low and may be equal to an ambient temperature. As such, the vehicle may be actuated outside of the parking spot once desired by a vehicle occupant. In some examples, additionally or alternatively, if the vehicle is at least somewhat autonomous, the vehicle may actuate outside of the parking spot to a second position, which may be the same or different than the first position. The second position may be similar to the first position in that the same locations of the parking spot which were estimated to be below the coolant reservoir, oil pan, engine, and transmission are still visible. Between t6 and t7, the vehicle remains parked and second images of the parking spot are not yet captured.

At t7, the vehicle is turned on. Between t7 and t8, the vehicle is moved out of the parking spot to the second position, where second images of the parking spot are captured. At t8, the first and second images of the ground of the parking spot are compared. It is determined that the images do not match, which then indicates that a leak is present. Specifically, an external coolant leak is present. This may further include activating an indicator lamp within an interior of the vehicle In this way, a vehicle may comprise diagnostic methods for determining the presence of one or more of an internal fluid leak, an external fluid leak, and a degraded fluid sensor. The diagnostic methods may operate in conjunction with one or more image capturing devices arranged around a periphery of the vehicle. The technical effect of executing the fluid leak diagnostic methods in combination with image capturing devices arranged around the periphery of the vehicle is to automate the diagnostic and eliminate dependence of a human user smelling or visualizing a fluid leak. By doing this, life expectancy and performance of one or more of an autonomous vehicle and a car sharing vehicle may be increased.

An embodiment of a method comprising increasing an oil pump output intrusively to a high displacement during a higher engine load in response to an oil volume decreasing at greater than a threshold rate. A first example of the method further comprising where an image capturing device to visualize exhaust gas expelled from an exhaust pipe. A second example of the method, optionally including the first example, further includes where the image capturing device captures multiple images of exhaust gas, and where the images are passed through blue color frequencies. A third example of the method, optionally including the first and/or second examples, further includes where an internal oil leak is determined in response to an amount of blue in the images being greater than a threshold amount of blue. A fourth example of the method, optionally including one or more of the first through third examples, further includes where the oil pump output is decreased to a low displacement during higher engine loads in response to the oil volume decreasing at less than or equal to the threshold rate. A fifth example of the method, optionally including one or more of the first through fourth examples, further includes where the oil pump is arranged on an autonomous vehicle. A sixth example of the method, optionally including one or more of the first through fifth examples, further includes where higher engine loads include mid- and high-loads.

An embodiment of an engine method comprising arranging a vehicle outside of a parking spot at a first position, capturing a first image of the parking spot via an image capturing device, propelling the vehicle to the parking spot, waiting a threshold duration, propelling the vehicle to the first position, capturing a second image of the parking spot, and determining an external oil leak based on gray scale values assigned to the first and second images. A first example of the engine method further includes where the gray scale values include a gray scale value selected between 1 to 5 assigned to each pixel of the first and second images, wherein 1 corresponds to a light gray color and 5 corresponds to a dark gray color. A second example of the engine method, optionally including the first example, further includes where the external oil leak is occurring if a sum of the gray scale values of the first image is less than a sum of the gray scale values of the second image. A third example of the engine method, optionally including the first and/or third examples, further includes where the image capturing device is one of a plurality of image capturing devices, wherein the plurality of image capturing devices may be arranged around a periphery of the vehicle. A fourth example of the engine method, optionally including one or more of the first through third examples, further includes where the first position is outside of the parking spot by a total length of the vehicle. A fifth example of the engine method, optionally including one or more of the first through fourth examples, further includes where the vehicle is an autonomous vehicle. A sixth example of the engine method, optionally including one or more of the first through fifth examples, further includes where detecting an oil volume decreasing at greater than a threshold rate. A seventh example of the engine method, optionally including one or more of the first through sixth examples, further includes where the image capturing device is one or more of a front camera or a reverse camera.

An embodiment of an engine method comprising arranging a vehicle outside of a parking spot at a first position, capturing a first image of the parking spot via an image capturing device, propelling the vehicle to the parking spot, propelling the vehicle outside of the parking to a second position after parking the vehicle, capturing a second image of the parking spot, and identifying an oil leak based on a comparison of the first and second images. A first example of the engine method further includes where the comparison includes assigning gray scale values to the first and second images, and where the gray scale values include a gray scale value selected between 1 to 5 assigned to each pixel of the first and second images, wherein 1 corresponds to a light gray color and 5 corresponds to a dark gray color. A second example of the engine method, optionally including the first example, further includes where the external oil leak is occurring if a sum of the gray scale values of the first image is less than a sum of the gray scale values of the second image. A third example of the engine method, optionally including the first and/or second examples, further includes where the image capturing device is one of a plurality of image capturing devices arranged around a periphery of the vehicle. A fourth example of the engine method, optionally including one or more of the first through third examples, further includes where the first position and the second position are outside of the parking spot, and where each of the first image and the second image capture a portion of the parking spot above which an engine and a transmission will be arranged. A fifth example of the engine method, optionally including one or more of the first through fourth examples, further includes where the first position and the second position are identical. A sixth example of the engine method, optionally including one or more of the first through fifth examples, further includes where detecting an oil volume decreasing at greater than a threshold rate. A seventh example of the engine method, optionally including one or more of the first through sixth examples, further includes where the first position and the second position are different.

An embodiment of a system comprising an autonomous vehicle comprising a hybrid engine selectively coupleable to an electric motor and a controller with computer-readable instructions stored on non-transitory memory thereof that when executed enable the controller to execute an oil leak diagnostic in response to an oil volume decreasing at greater than a threshold rate, the oil leak diagnostic including an internal oil leak diagnostic and an external oil leak diagnostic, the internal oil leak diagnostic including intrusively increasing an oil pump output to a high displacement during a higher engine load and detecting an amount of blue in exhaust gas to detect an internal oil leak, the external oil leak diagnostic including arranging the autonomous vehicle a length of the vehicle outside of a parking spot, capturing a first image of the parking spot, arranging the vehicle the length of the vehicle outside of the parking spot following a threshold duration, capturing a second image, and comparing gray scale sums of the first and second images to detect an external oil leak, and in the absence of the internal and external oil leaks, indicating an oil sensor as degraded. A first example of the system further includes where the autonomous vehicle comprises a plurality of image capturing devices arranged along one or more of a front, a rear, a left side, a right side, and a top of the vehicle. A second example of the system, optionally including the first example, further includes where the length of the vehicle is measured relative to a direction of propulsion desired to park the vehicle in the parking spot. A third example of the system, optionally including the first and/or second examples, further includes where the oil sensor is coupled to an oil pan, and where the threshold duration is based on an engine off soak state. A fourth example of the system, optionally including one or more of the first through third examples, further includes where the internal oil leak diagnostic comprises imaging the exhaust gas via a first image capturing device and where the external oil leak diagnostic comprising capturing the first and second images via a second image capturing device, the second image capturing device being similar or different than the first image capturing device.

An embodiment of a method comprising increasing a fluid pump output intrusively to a high displacement during a higher engine load in response to a fluid volume decreasing at greater than a threshold rate. A first example of the method further includes directing an image capturing device to visualize exhaust gas expelled from an exhaust pipe, and where an engine start is a hot start and an amount of condensate in an exhaust system is less than a threshold amount of condensate. A second example of the method, optionally including the first example, further includes where the image capturing device captures at least one image of exhaust gas, and where the images are passed through white color frequencies. A third example of the method, optionally including the first and/or second examples, further includes where the fluid pump is a coolant pump, and where an internal coolant leak is determined in response to an amount of white in the at least one image being greater than a threshold amount of white. A fourth example of the method, optionally including one or more of the first through third examples, further includes where the fluid pump output is decreased to a low displacement during higher engine loads in response to the fluid volume decreasing at less than or equal to the threshold rate. A fifth example of the method, optionally including one or more of the first through fourth examples, further includes where the fluid pump is arranged on an autonomous vehicle. A sixth example of the method, optionally including one or more of the first through fifth examples, further includes where higher engine loads include mid- and high-loads.

An embodiment of an engine method comprising arranging a vehicle outside of a parking spot at a first position, capturing a first image of the parking spot via an image capturing device, propelling the vehicle to the parking spot, propelling the vehicle outside of the parking to a second position after parking the vehicle, capturing a second image of the parking spot, and identifying a coolant leak based on a comparison of the first and second images. A first example of the engine method further includes where the comparison includes assigning gray scale values to the first and second images, and where the gray scale values include a gray scale value selected between 1 to 5 assigned to each pixel of the first and second images, wherein 1 corresponds to a light gray color and 5 corresponds to a dark gray color. A second example of the engine method, optionally including the first example, further includes where the coolant leak is occurring if a sum of the gray scale values of the first image is different than a sum of the gray scale values of the second image, and where the coolant leak is an external coolant leak. A third example of the engine method, optionally including the first and/or second examples, further includes where the image capturing device is one of a plurality of image capturing devices arranged around a periphery of the vehicle. A fourth example of the engine method, optionally including one or more of the first through third examples, further includes where the first position and the second position are outside of the parking spot, and where each of the first image and the second image capture a portion of the parking spot above which an engine, a transmission, and a radiator will be arranged. A fifth example of the engine method, optionally including one or more of the first through fourth examples, further includes where the first position and the second position are identical. A sixth example of the engine method, optionally including one or more of the first through fifth examples, further includes where detecting a coolant volume decreasing at greater than a threshold rate. A seventh example of the engine method, optionally including one or more of the first through sixth examples, further includes where the first position and the second position are different.

An embodiment of a system comprising an autonomous vehicle comprising a hybrid engine selectively coupleable to an electric motor and a controller with computer-readable instructions stored on non-transitory memory thereof that when executed enable the controller to execute a coolant leak diagnostic in response to a coolant volume decreasing at greater than a threshold rate, the coolant leak diagnostic including an internal coolant leak diagnostic and an external coolant leak diagnostic, the internal coolant leak diagnostic including intrusively increasing a coolant pump output to a high displacement during a higher engine load and detecting an amount of white in exhaust gas to detect an internal coolant leak, the external coolant leak diagnostic including arranging the autonomous vehicle outside of a parking spot, capturing a first image of the parking spot, arranging the vehicle outside of the parking spot following a threshold duration, capturing a second image, and comparing gray scale sums of the first and second images to detect an external coolant leak, and in the absence of the internal and external coolant leaks, indicating a coolant sensor as degraded. A first example of the system further includes where the autonomous vehicle comprises a plurality of image capturing devices arranged along one or more of a front, a rear, a left side, a right side, and a top of the vehicle. A second example of the system, optionally including the first example, further includes where arranging the vehicle outside of the parking spot includes arranging the vehicle a length of the vehicle outside of the parking spot, wherein the length of the vehicle is measured relative to a direction of propulsion desired to park the vehicle in the parking spot. A third example of the system, optionally including the first and/or second examples, further includes where the coolant sensor is coupled to a radiator, and where the threshold duration is based on an engine off soak state. A fourth example of the system, optionally including one or more of the first through third examples, further includes where the internal coolant leak diagnostic comprises imaging the exhaust gas via a first image capturing device and where the external oil leak diagnostic comprising capturing the first and second images via a second image capturing device, the second image capturing device being similar or different than the first image capturing device, and where the internal coolant leak diagnostic is initiated in response to one or more of an engine start being a hot start and an amount of condensate in an exhaust system being less than a threshold amount of condensate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
increasing a fluid pump output intrusively to a higher displacement during a higher engine load in response to a fluid volume decreasing at greater than a threshold rate, wherein the higher engine load includes mid- and high-loads, wherein a high-load is greater than a mid-load, and wherein the fluid pump output is decreased to a lower displacement during higher engine loads in response to the fluid volume decreasing at less than or equal to the threshold rate, wherein the lower displacement is less than the higher displacement.

2. The method of claim 1, further comprising directing an image capturing device to visualize exhaust gas expelled from an exhaust pipe, and where an engine start is a hot start and an amount of condensate in an exhaust system is less than a threshold amount of condensate.

3. The method of claim 2, wherein the image capturing device captures at least one image of exhaust gas, and where the images are passed through white color frequencies.

4. The method of claim 3, wherein the fluid pump is a coolant pump, and where an internal coolant leak is determined in response to an amount of white in the at least one image being greater than a threshold amount of white.

5. The method of claim 1, wherein the fluid pump is arranged on an autonomous vehicle.

6. An engine method comprising:
arranging a vehicle outside of a parking spot at a first position;
capturing a first image of the parking spot via an image capturing device;
propelling the vehicle to the parking spot;
propelling the vehicle outside of the parking spot to a second position after parking the vehicle;
capturing a second image of the parking spot; and
identifying a coolant leak based on a comparison of the first and second images.

7. The engine method of claim 6, wherein the comparison includes assigning gray scale values to the first and second images, and where the gray scale values include a gray scale value selected between 1 to 5 assigned to each pixel of the first and second images, wherein 1 corresponds to a light gray color and 5 corresponds to a dark gray color.

8. The engine method of claim 7, wherein the coolant leak is occurring if a sum of the gray scale values of the first image is different than a sum of the gray scale values of the second image, and where the coolant leak is an external coolant leak.

9. The engine method of claim 6, wherein the image capturing device is one of a plurality of image capturing devices arranged around a periphery of the vehicle.

10. The engine method of claim 6, wherein the first position and the second position are outside of the parking spot, and where each of the first image and the second image capture a portion of the parking spot above which an engine, a transmission, and a radiator will be arranged.

11. The engine method of claim 6, wherein the first position and the second position are identical.

12. The engine method of claim 6, further comprising detecting a coolant volume decreasing at greater than a threshold rate.

13. The engine method of claim 6, wherein the first position and the second position are different.

14. A system comprising:
an autonomous vehicle comprising a hybrid engine selectively coupleable to an electric motor; and
a controller with computer-readable instructions stored on non-transitory memory thereof that when executed enable the controller to:
execute a coolant leak diagnostic in response to a coolant volume decreasing at greater than a threshold rate;
the coolant leak diagnostic including an internal coolant leak diagnostic and an external coolant leak diagnostic;
the internal coolant leak diagnostic including intrusively increasing a coolant pump output to a high displacement during a higher engine load and detecting an amount of white in exhaust gas to detect an internal coolant leak;
the external coolant leak diagnostic including arranging the autonomous vehicle outside of a parking spot, capturing a first image of the parking spot, arranging the vehicle outside of the parking spot following a threshold duration, capturing a second image, and comparing gray scale sums of the first and second images to detect an external coolant leak; and
in the absence of the internal and external coolant leaks, indicating a coolant sensor as degraded.

15. The system of claim 14, wherein the autonomous vehicle comprises a plurality of image capturing devices arranged along one or more of a front, a rear, a left side, a right side, and a top of the vehicle.

16. The system of claim 14, wherein arranging the vehicle outside of the parking spot includes arranging the vehicle a length of the vehicle outside of the parking spot, wherein the length of the vehicle is measured relative to a direction of propulsion desired to park the vehicle in the parking spot.

17. The system of claim 14, wherein the coolant sensor is coupled to a radiator, and where the threshold duration is based on an engine off soak state.

18. The system of claim 14, wherein the internal coolant leak diagnostic comprises imaging the exhaust gas via a first image capturing device and where the external oil leak diagnostic comprising capturing the first and second images via a second image capturing device, the second image capturing device being similar or different than the first image capturing device, and where the internal coolant leak diagnostic is initiated in response to one or more of an engine start being a hot start and an amount of condensate in an exhaust system being less than a threshold amount of condensate.

* * * * *